(12) United States Patent
Gill

(10) Patent No.: US 8,851,773 B2
(45) Date of Patent: Oct. 7, 2014

(54) ADJUSTABLE ATTACHMENT FOR AN APPLICATOR BOX

(75) Inventor: Thomas Charles Gill, Varsity Lakes (AU)

(73) Assignee: Tape-Pro Drywall Tools Pty Limited, Burleigh Heads (AU)

( * ) Notice: Subject to any disclaimer, the term of this patent is extended or adjusted under 35 U.S.C. 154(b) by 422 days.

(21) Appl. No.: 13/306,074

(22) Filed: Nov. 29, 2011

(65) Prior Publication Data

US 2012/0132770 A1    May 31, 2012

(30) Foreign Application Priority Data

Nov. 30, 2010   (AU) ................................ 2010246542

(51) Int. Cl.
*A46B 17/02* (2006.01)
*B05C 17/10* (2006.01)
*E04F 21/165* (2006.01)
*F16B 2/06* (2006.01)

(52) U.S. Cl.
CPC ............... *E04F 21/165* (2013.01); *F16B 2/065* (2013.01)
USPC .......................................... 401/48; 15/235.4

(58) Field of Classification Search
CPC .............................. E04F 21/165; B05C 17/005
USPC ............. 401/48, 264; 15/235.4; 425/87, 458; 248/226.11
See application file for complete search history.

(56) References Cited

U.S. PATENT DOCUMENTS

| | | | | |
|---|---|---|---|---|
| 5,099,539 | A | * | 3/1992 | Forester ..................... 15/144.3 |
| 6,146,039 | A | * | 11/2000 | Pool et al. ...................... 401/48 |
| 8,523,467 | B2 | * | 9/2013 | Murray ............................. 401/5 |
| 8,555,452 | B2 | * | 10/2013 | Murray ......................... 15/235.4 |

FOREIGN PATENT DOCUMENTS

WO    WO 2011153285 A1 *  12/2011

* cited by examiner

*Primary Examiner* — David Walczak
*Assistant Examiner* — Jennifer C Chiang
(74) *Attorney, Agent, or Firm* — The Webb Law Firm

(57) ABSTRACT

An adjustable attachment for an applicator box to attach a handle, the adjustable attachment including a mounting plate for attachment to the applicator box having raised portion defining an enclosure between the raised portion and the application box, the enclosure accessible from at least one side, and attachment portion to attach to the handle, and a clamping assembly to clamp the attachment portion to the mounting plate and including at least one threaded member associated with a thumbwheel, rotation of the thumbwheel moving the clamping assembly between a clean condition which at least temporarily fixes the application box and handle relative to one another and a free condition in which the applicator box and handle are movable in relation to one another.

16 Claims, 12 Drawing Sheets

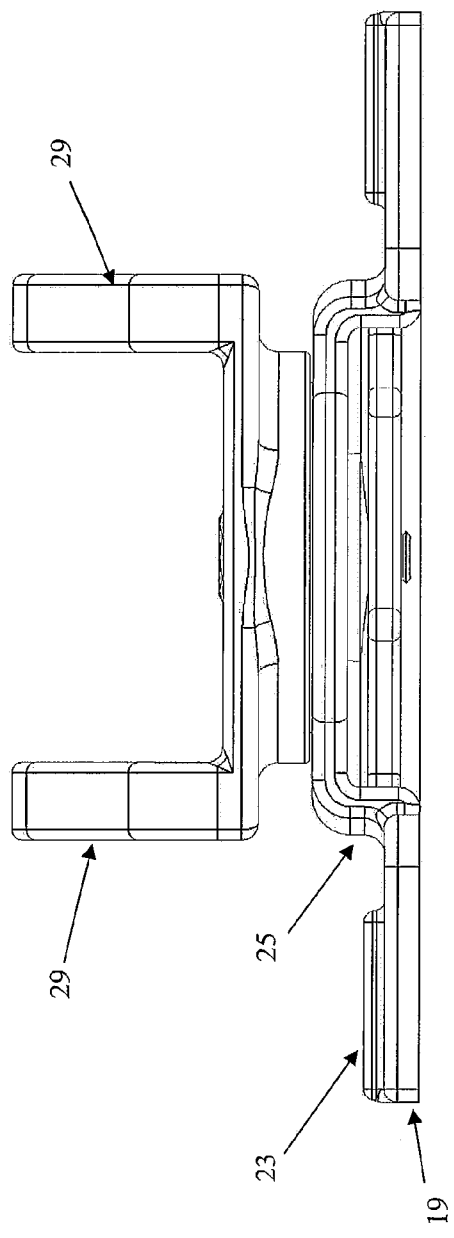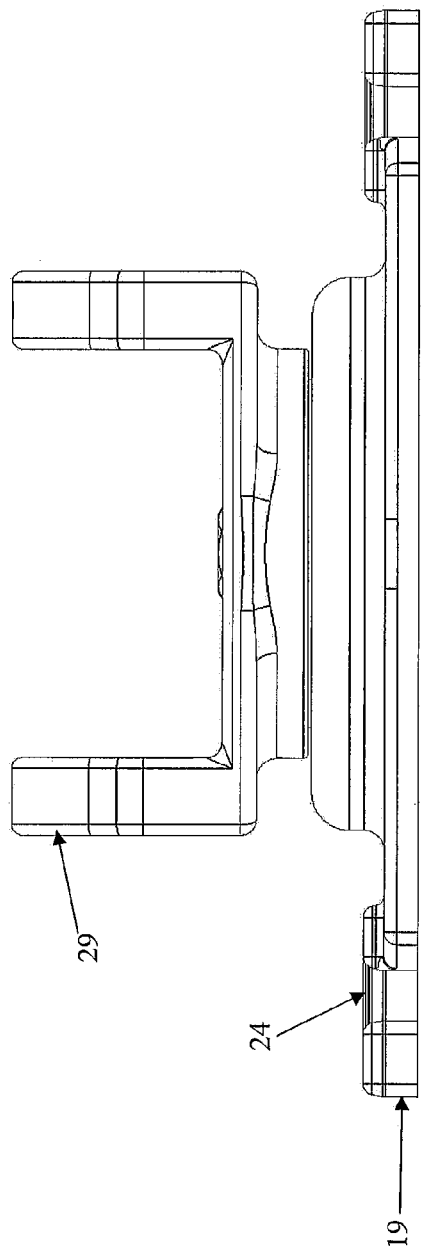

ADJUSTABLE ATTACHMENT FOR AN APPLICATOR BOX

FIELD OF THE INVENTION

The present invention relates to application of material to joins between sheeting for a plaster wall or ceiling and particularly to an adjustable attachment for an applicator box for applying the material.

BACKGROUND ART

In building, when using plaster board panels to face a wall, the join between adjacent plaster boards is visible. If not filled or otherwise finished, the joint will remain visible even after painting.

An applicator box or "flat box" is used to apply joint compound to flat recess and butt joints, automatically crowning the joint and feathering the edges.

The joints are typically in either a vertical or horizontal orientation normally but there may be situations when they are angled. Further, when the plaster boards are applied to a high wall or ceiling, locating the flat box in position and actually maneuvering the flat box can be difficult.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to an adjustable attachment for an applicator box, which may at least partially overcome at least one of the abovementioned disadvantages or provide the consumer with a useful or commercial choice.

With the foregoing in view, the present invention in one form, resides broadly in an adjustable attachment for an applicator box to attach a handle, the adjustable attachment including a mounting plate for attachment to the applicator box having raised portion defining an enclosure between the raised portion and the application box, the enclosure accessible from at least one side, and attachment portion to attach to the handle, and a clamping assembly to clamp the attachment portion to the mounting plate and including at least one threaded member associated with a thumbwheel, rotation of the thumbwheel moving the clamping assembly between a clamped condition which at least temporarily fixes the applicator box and handle relative to one another and a free condition in which the applicator box and handle are movable in relation to one another.

In a second embodiment, the invention resides in an applicator box and handle with an adjustable attachment for an applicator box to attach a handle, the adjustable attachment including a mounting plate for attachment to the applicator box having raised portion defining an enclosure between the raised portion and the application box, the enclosure accessible from at least one side, and attachment portion to attach to the handle, and a clamping assembly to clamp the attachment portion to the mounting plate and including at least one threaded member associated with a thumbwheel, rotation of the thumbwheel moving the clamping assembly between a clamped condition which at least temporarily fixes the applicator box and handle relative to one another and a free condition in which the applicator box and handle are movable in relation to one another.

The adjustable attachment of the present invention is preferably mounted to an upper surface of the applicator box. A fastener such as a bolt or similar, is provided in association with the thumbwheel to releaseably clamp the mounting plate relative to the attachment portion.

The mounting plate for attachment to the applicator box is preferably substantially planar except for a central portion. The mounting plate may have any shape.

In particular, the mounting plate may have a pair of side plates. Each of the side plates is preferably planar and is adapted to abut an upper surface of the applicator box. Preferably, each of the side plates is connected by a plate extending about the central portion on at least one side, and which together with the side plates, creates a substantially U-shaped plate for abutment with the upper surface of the applicator box, the U-shaped plate at least partially surrounding a main enclosure.

The mounting plate may be provided with one or more fasteners and threaded fasteners particularly preferred. The preferred threaded fastener is typically associated with a nut or similar. The fasteners provided are preferably not provided to attach the mounting plate to the applicator box, but extend upwardly away from the applicator box.

The mounting plate may additionally include one or more upstands. The fasteners described above will preferably be provided in association with the upstands with one fastener typically provided on each upstand. The upstands will normally be located at a level further from the surface of the applicator box than the mounting plate.

The applicator box and mounting plate will typically be permanently attached to one another and any one of a variety of methods may be used to accomplish this such as adhesives, bonding, fusing or the like.

Each upstand preferably provides or at least partially defines a recess or enclosure between the upstand and the applicator box. Typically, a head of a fastener is received to herein with a fastener shank extending upwardly away from the applicator box. Preferably, a U-shaped opening is provided in the upstand in order to allow the fastener to be associated with the upstand by sliding the shank into the opening such that the head of the fastener is received in the recess or enclosure.

Alternatively, a closed opening may be provided in the upstand from which the fastener is not removable.

Each fastener provided in this manner is preferably threaded and engages with a nut or wingnut or similar.

Preferably, the raised portion of the mounting plate will define a main enclosure. Preferably, the main enclosure is approximately central across the mounting plate. Further, the mounting plate will typically be mounted to the applicator box approximately centrally to prevent twisting of the applicator box when desired.

The main enclosure is preferably at least partially defined by an upward extending side wall and a laterally extending cover. Typically, the laterally extending cover will have an opening therethrough.

The main enclosure is preferably at least partially circular when viewed in plan. According to the most preferred embodiment, the main enclosure will be circular with a circular segment removed, when viewed in plan. The removal of the circular segment preferably forms an access opening into the main enclosure.

The main enclosure preferably provides a housing for the thumbwheel of the clamping assembly. The portion of the side wall which has been removed, allows access to the thumbwheel or alternatively, the thumbwheel may protrude at least partially through the open sidewall.

Typically, the thumbwheel is specifically sized to fit within the main enclosure and be rotatable within the housing.

The main enclosure also preferably includes a shaped upstand about the opening through the laterally extending cover. This shaped upstand may be a collar which will typically act to guide and support the preferred fastener attaching the mounting plate relative to the attachment portion.

The mounting plate of the invention may be metal or plastic but will typically be robust and capable of tolerating what may be, in some circumstances, large loads.

The invention also includes an attachment portion to attach the handle. The attachment portion is preferably a planar portion or plate. The attachment portion also normally includes at least one, and typically a pair of opposed attachment flanges. Each attachment flange is preferably perpendicular to the planar portion. Each attachment flange will preferably have a transverse opening in order to receive a pivot rod to which the handle is preferably attached.

There will preferably be an intersecting opening in each attachment flange which intersects with the transverse opening in each flange. The intersecting opening is typically adapted to receive a grub screw or similar which can abut the pivot rod connecting the handle and therefore capable of clamping the pivot rod in position or to allow pivoting of the pivot rod when the grub screw is free of the pivot rod.

The planar portion of the attachment portion is preferably provided with a central opening. The central opening in the plate will typically be aligned with the opening in the mounting plate and normally, a fastener or similar extends through both openings in order to attach the attachment portion to the mounting plate.

The central opening in the planar plate will typically be surrounded by a shaped recess in the plate. This shaped recess will typically at least partially receive the head of the fastener. The shaped recess will typically prevent rotation of the fastener due to abutment of the head with the surrounds defining the shaped opening. The recess will also allow the head to be sunk into the plate so as to be unobstructive.

Typically, a lower surface of the plate will be provided with an abutment surface in order to abut either the upper side of the main enclosure or, according to a more preferred embodiment, one or more braking washers. Any such surfaces may be hardened or provided with a wear resistant coating or made of a wear resistant material.

According to a particularly preferred embodiment, a pair of side wings may be provided as extensions to the planar plate outside the attachment flanges. Each of the wings is preferably provided with at least one opening. Typically, each opening will be a U-shaped opening or have a U-shaped portion. These openings are preferably adapted to receive the upstanding fasteners extending from the mounting plate in order to fix the orientation of the handle and the applicator box in a "square" position. By manipulation of the nut or wingnut provided with the fastener, the nut may clamp the wings relative to the mounting plate once the U-shaped openings are aligned with the respective fastener. When removed, the attachment portion may be freely manipulated into the desired position and then fixed there with the clamping assembly.

An annular collar may be provided on an underside of the attachment plate in order to receive or guide parts of the clamping assembly.

It can be seen from the above description that the adjustable attachment of the invention therefore provides the ability to fix the handle to the attachment portion at a particular orientation, to fix the attachment portion and the mounting plate at a "square" orientation and to fix the attachment portion and mounting plate at any of the orientation as required. The preferred embodiment also has the ability to fix the handle to the attachment portion in a fixed position as well as to allow the handle to pivot relative to the attachment portion.

The adjustable attachment of the invention can also be used to set or provide a predetermined drag or resistance to motion that maintains the box in a set position relative to the handle but which can be changed without loosening the thumbwheel. For example, once set in position, the box may be adjusted if a force sufficient to overcome the friction of the clamping assembly is applied to move the box relative to the handle without loosening the thumbwheel. It is envisaged that the attachment will be used in this manner primarily that is set the drag friction so that it provides enough stability to operate and guide the box, and yet still be able to rotate the handle to a different angle (when changing sides).

The invention also includes a clamping assembly to clamp the attachment portion to the mounting plate. The clamping assembly will typically include the threaded fastener extending through the attachment portion and the mounting plate. This fastener is typically a bolt or similar. The bolt typically engages with the thumbwheel which is located in the main enclosure.

A Bellville washer is normally located between an underside of the enclosure and the upper side of the thumbwheel. The Bellville washer is typically oriented such that the edges of the Bellville washer will typically abut the enclosure and a central portion of the Bellville washer will normally abut the thumbwheel.

The thumbwheel will therefore preferably have a central abutment portion. This is typically configured as an annular collar or similar with a main opening with an internal thread in order to engage with the fastener.

An outer portion is provided on the thumbwheel with a number of finger members or any other gripping means to allow a user to rotate the thumbwheel. A note at this juncture must be made, that although the component is called a "thumbwheel", any finger may be used to rotate the thumbwheel or indeed, a tool may be used, although this is less preferred.

One or more braking washers are preferably provided surrounding the fastener and/or upstanding collar on the upper side of the raised enclosure on the mounting plate and within the annular collar which extends from the lower surface of the attachment portion. Each washer will typically be annular and will be received about the upstanding collar on the raised enclosure of the mounting plate and within the annular collar on the attachment portion in order to allow the collars to guide rotation.

As the name indicates, the washers have a braking function. They are therefore typically manufactured of materials or coated with materials which have a high coefficient of friction. Additionally, they may be at least partially resilient.

Typically, there is more than one braking washer and together, the braking washers are typically taller than the annular collar provided on the lower side of the attachment portion in order to prevent abutment of the collar with the mounting plate even when the clamping assembly is tightened. The braking washers preferably abut one another directly.

Any of the features described herein can be combined in any combination with any one or more of the other features described herein within the scope of the invention.

BRIEF DESCRIPTION OF THE DRAWINGS

Various embodiments of the invention will be described with reference to the following drawings, in which:

FIG. 9 is a front view of an adjustable attachment mechanism according to a preferred embodiment.

FIG. 10 is a rear view of an adjustable attachment mechanism according to a preferred embodiment.

DETAILED DESCRIPTION OF THE PREFERRED EMBODIMENT

Figure 1:
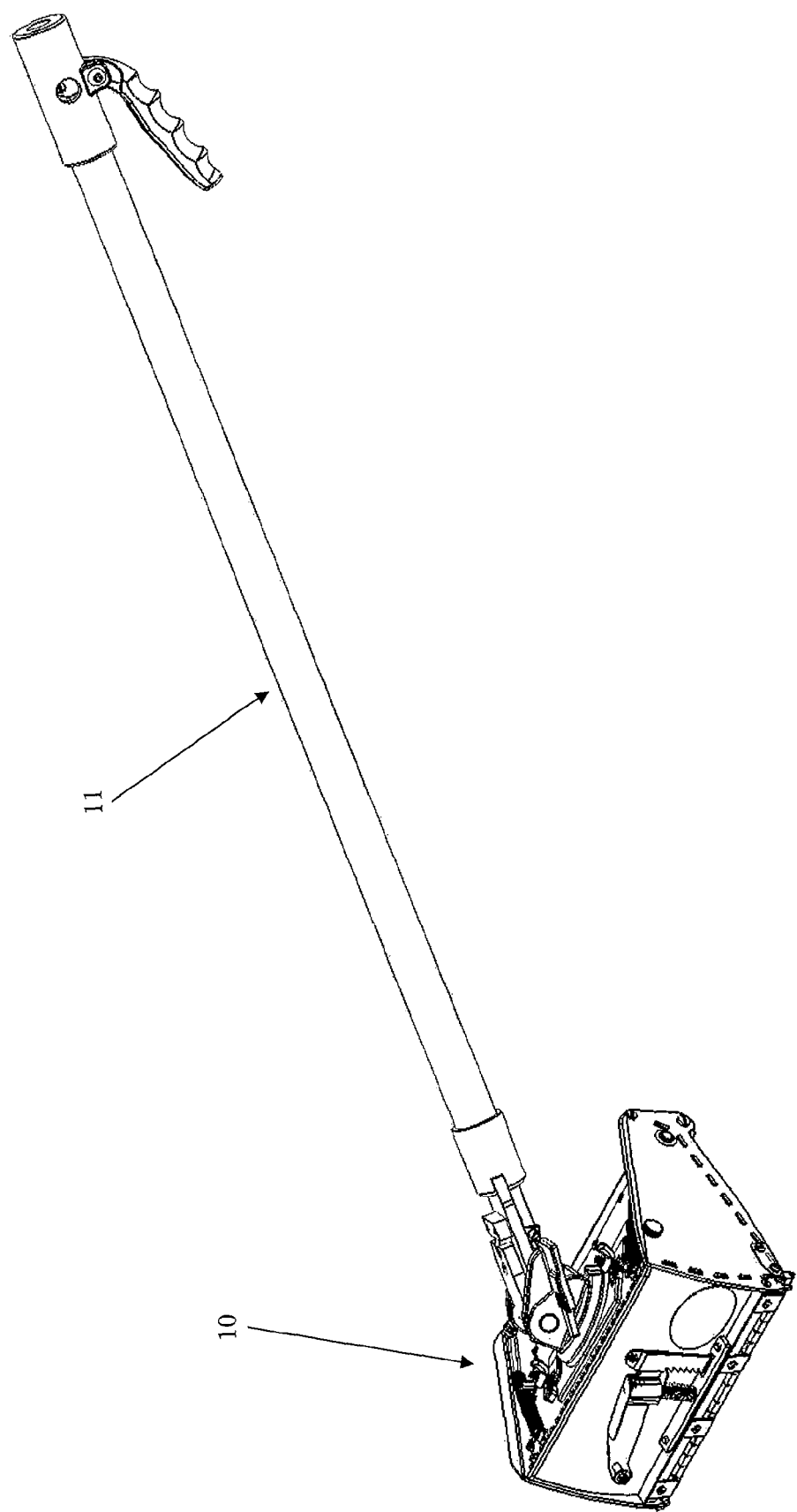
FIG. 1 is an isometric view of an applicator box with handle according to an embodiment of the present invention.

According to a particularly preferred embodiment, an adjustable attachment for an applicator box 10 to attach a handle 11 is provided. The basic setup of an applicator box and a handle is illustrated in FIG. 1.

Figure 7:
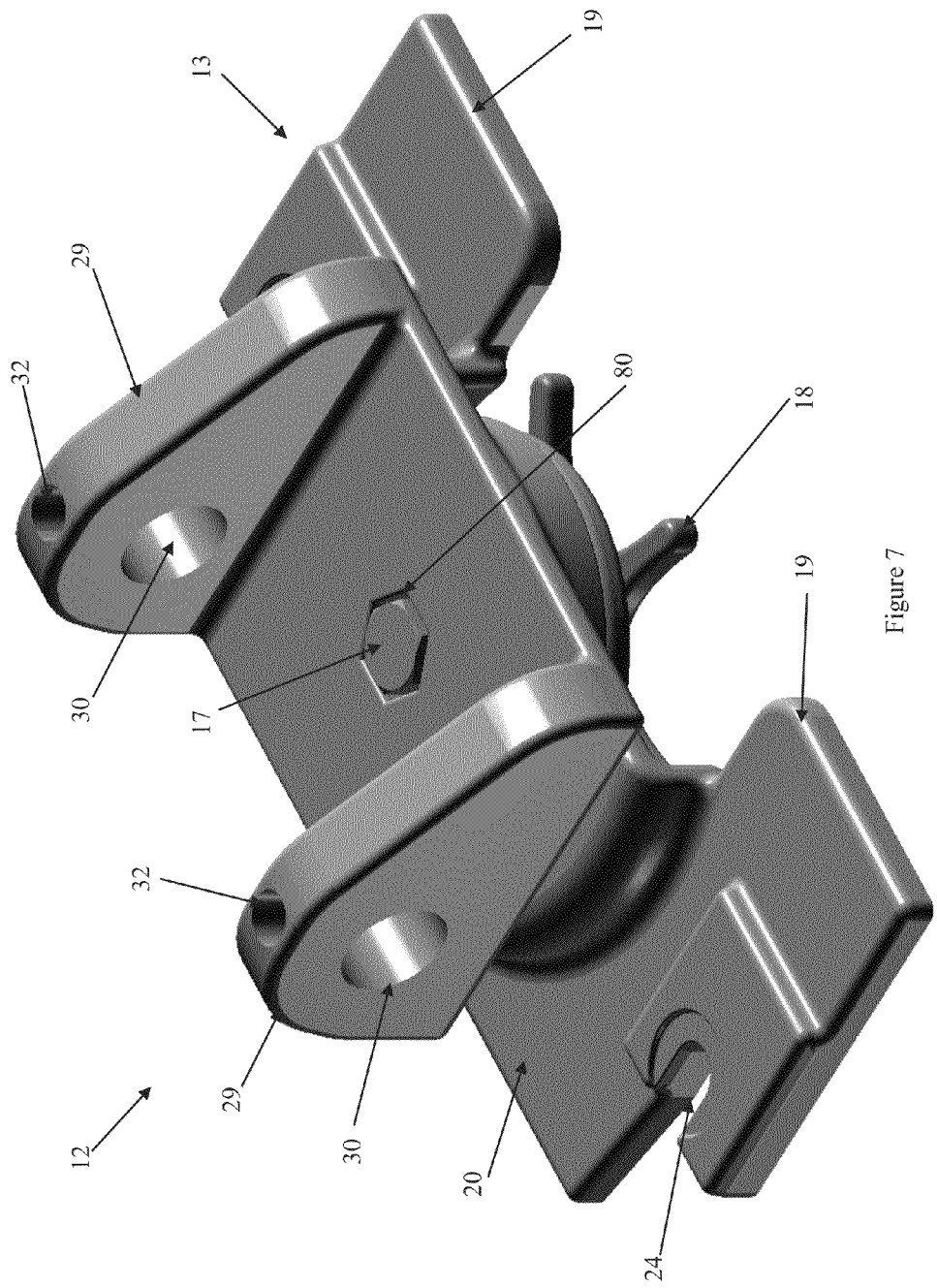
FIG. 7 is a rendered isometric view of an adjustable attachment mechanism according to a preferred embodiment.
Figure 8:
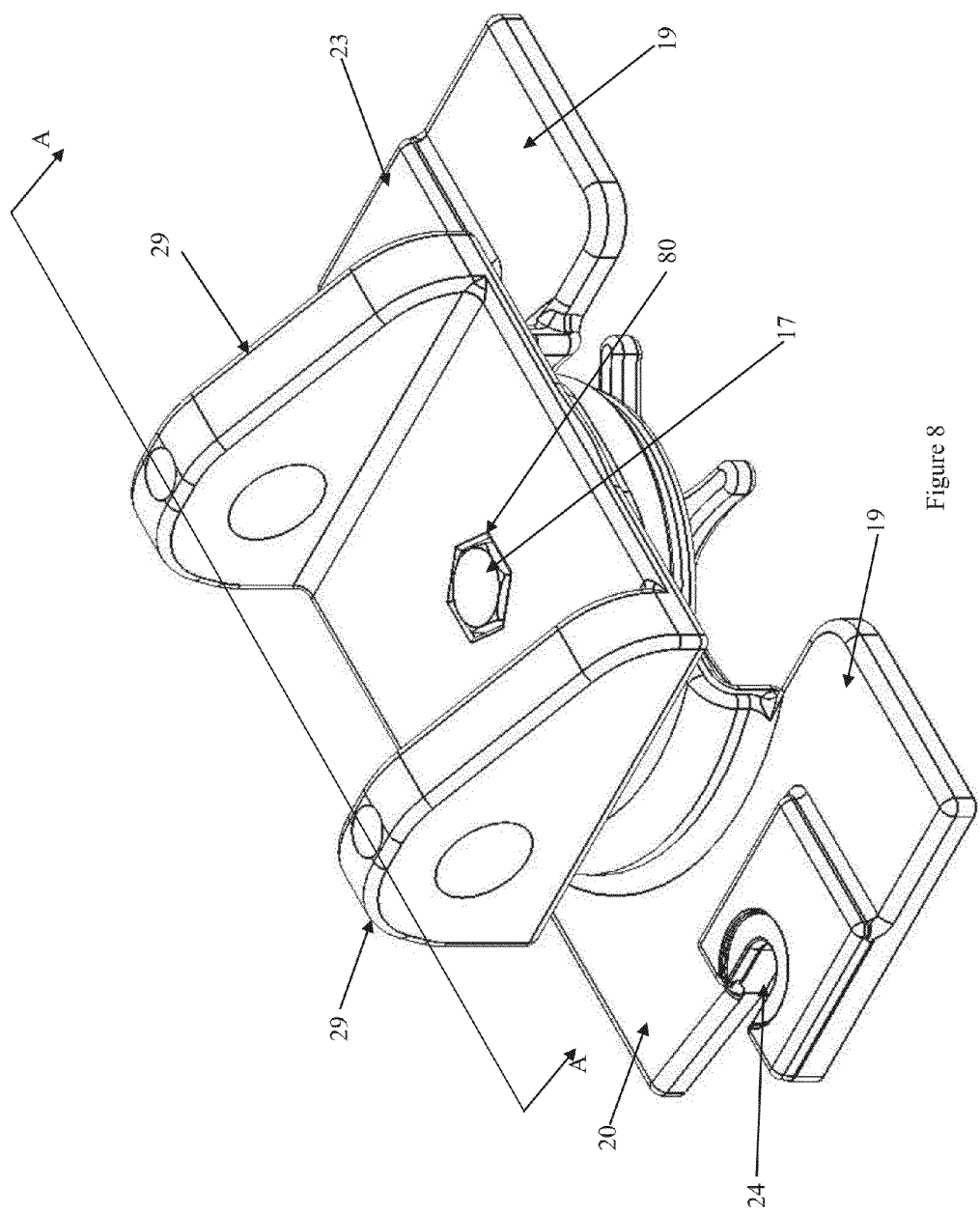
FIG. 8 is an isometric view of an adjustable attachment mechanism according to a preferred embodiment.
Figure 12:
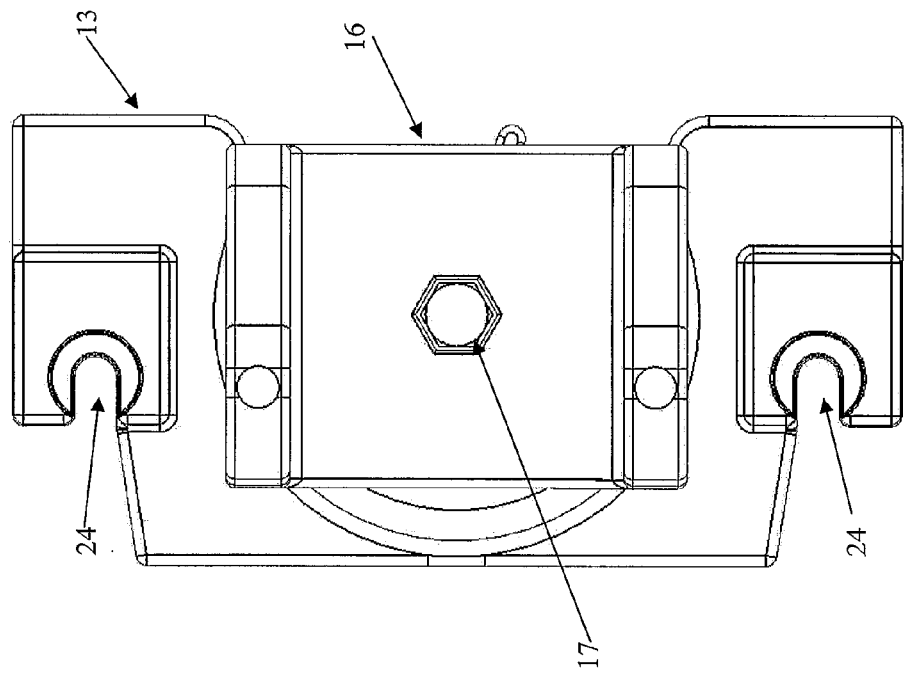
FIG. 12 is a top view of an adjustable attachment mechanism according to a preferred embodiment.
Figure 11:
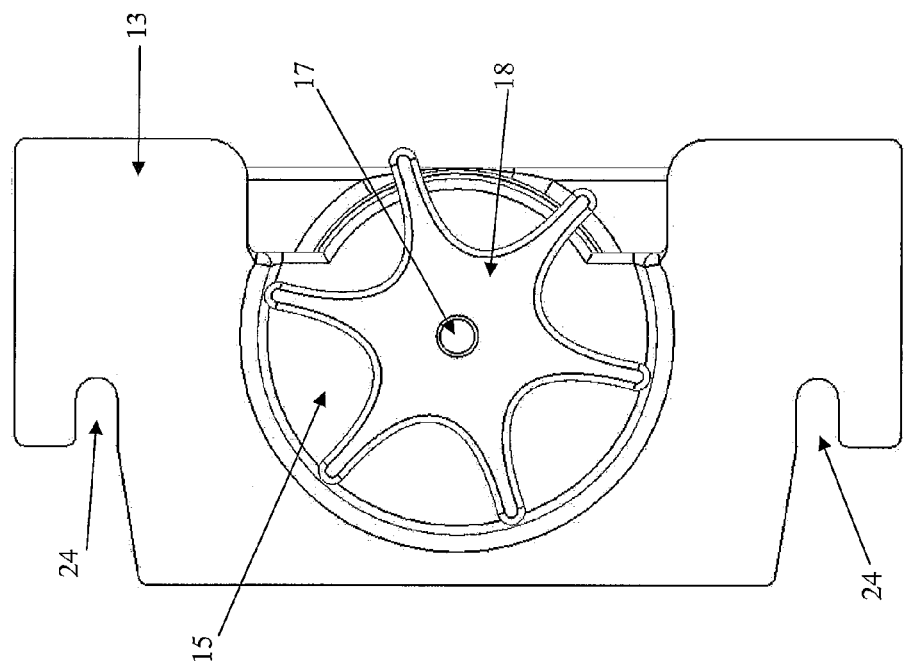
FIG. 11 is a bottom view of an adjustable attachment mechanism according to a preferred embodiment.
Figure 13:
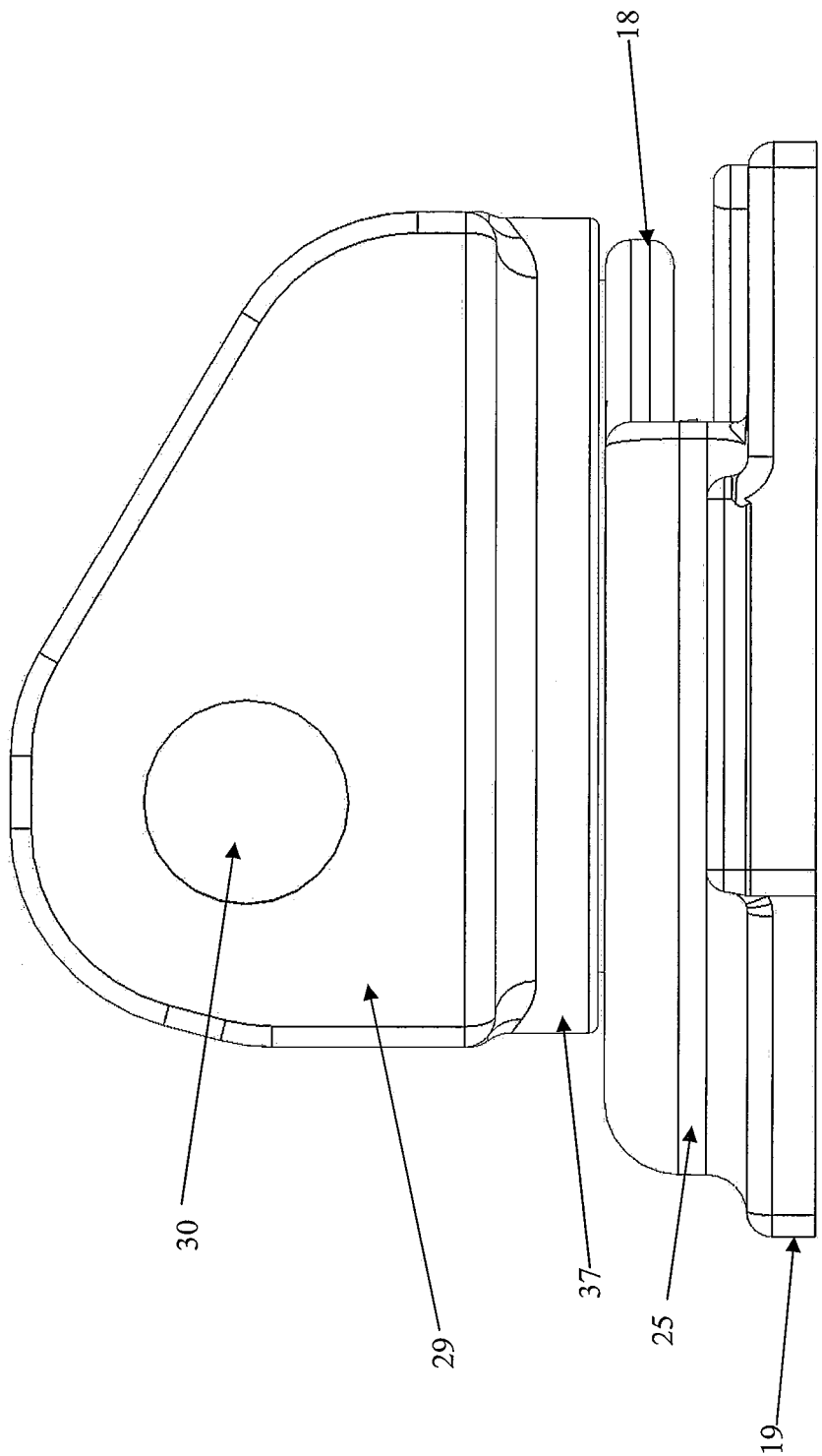
FIG. 13 is a side view of an adjustable attachment mechanism according to a preferred embodiment.

Best illustrated in FIGS. 7 and 8, the adjustable attachment 12 illustrated includes a mounting plate 13 for attachment to the applicator box 10 and having raised portion 14 defining an enclosure 15 between the raised portion 14 and the application box 10, the enclosure 15 accessible from at least one side, and an attachment portion 16 to attach to the handle 11, and a clamping assembly to clamp the attachment portion 16 to the mounting plate 13. The clamping assembly includes a threaded member 17 associated with a thumbwheel 18, rotation of the thumbwheel 18 moving the clamping assembly between a clamped condition which at least temporarily fixes the applicator box 10 and handle 11 relative to one another by clamping the attachment portion 16 relative to the main enclosure 15 of the mounting plate 13 and a free condition in which the applicator box 10 and handle 11 are movable in relation to one another. The clamping assembly of the preferred embodiment also includes an annular collar 37 and braking washers 34.

Figure 4:
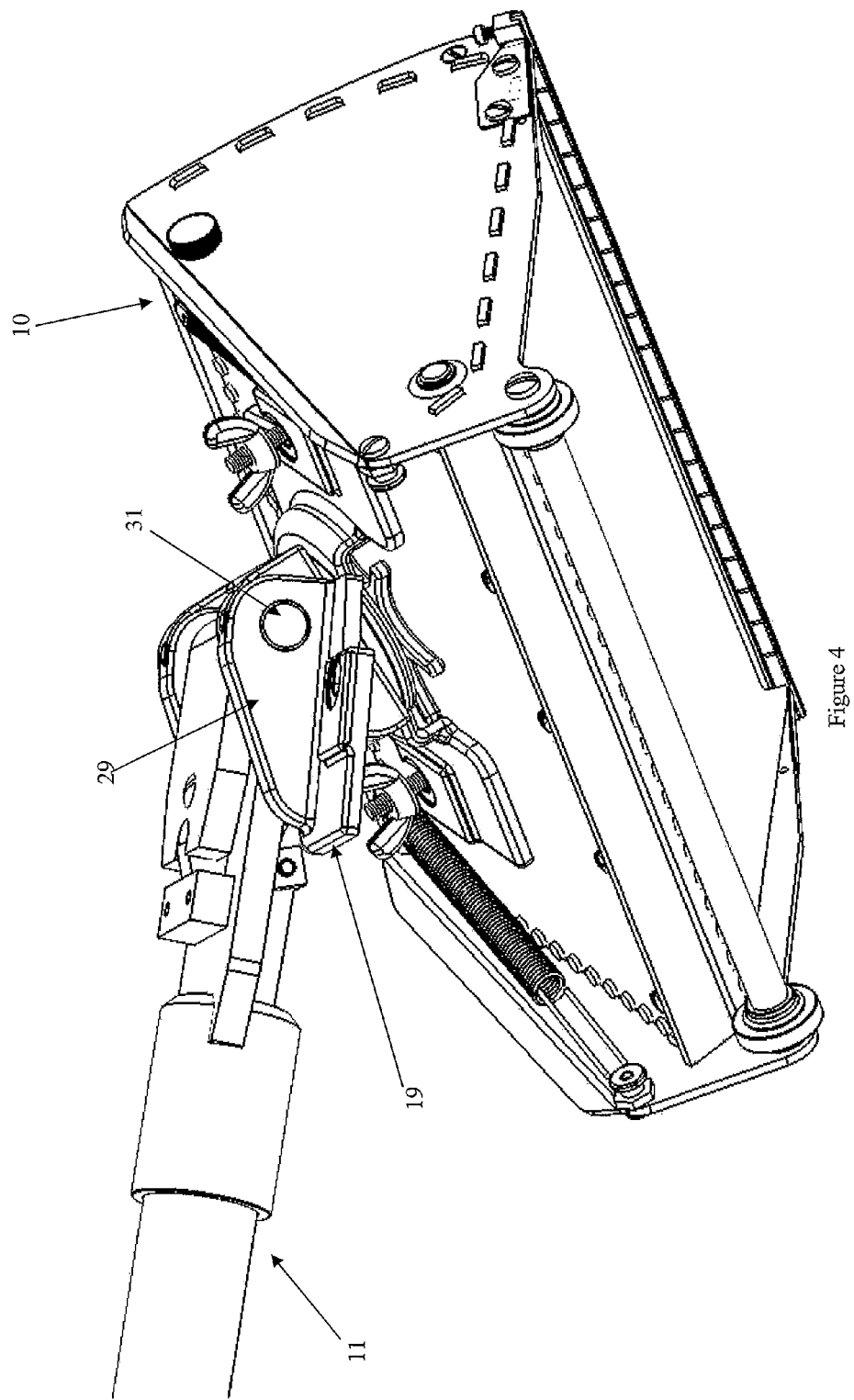
FIG. 4 is a lower rear isometric view of the attachment between the applicator box and handle of FIG. 1.
Figure 5:
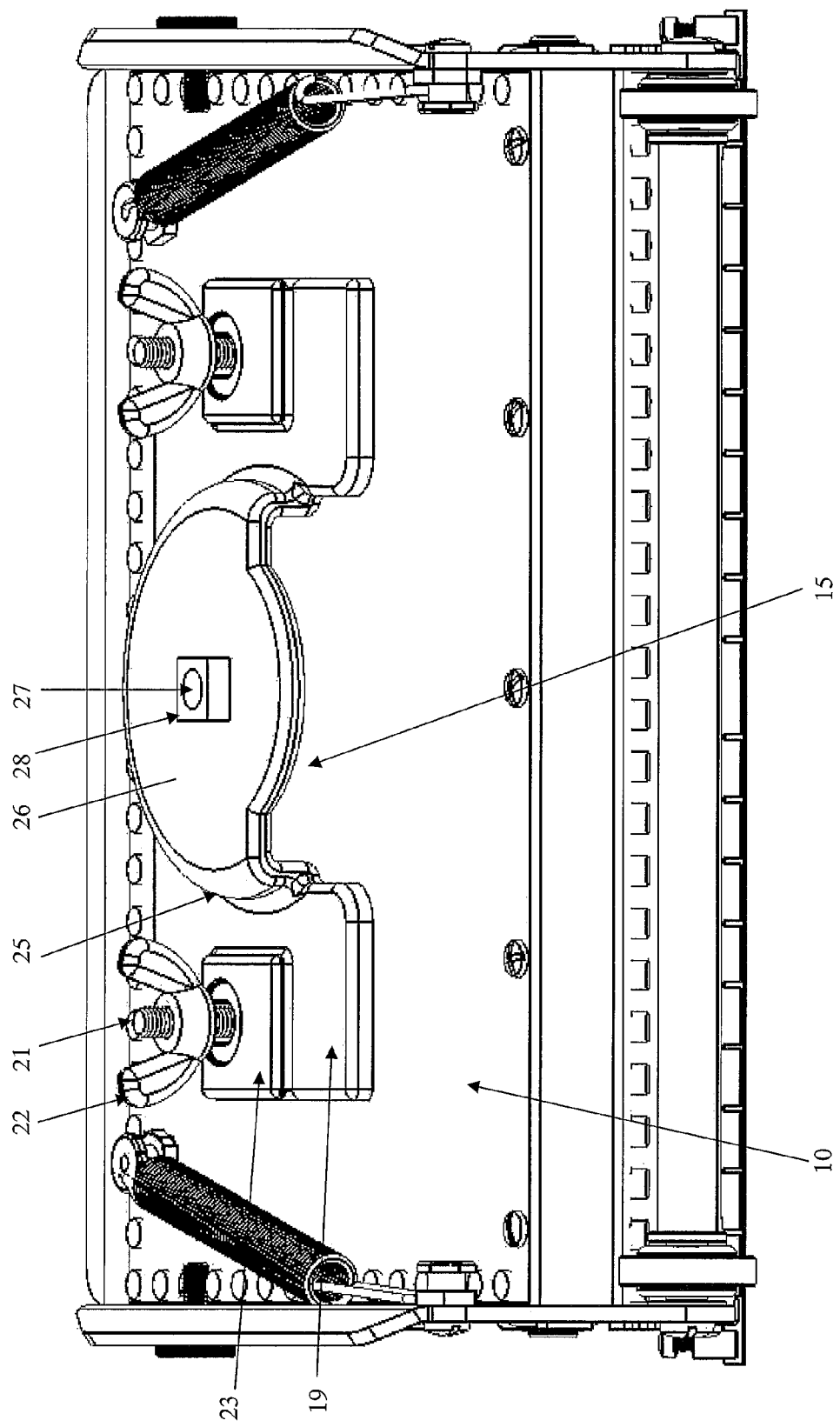
FIG. 5 is a rear view of a first part of an adjustable attachment mechanism between the applicator box and handle with the second part and handle removed.
Figure 6:
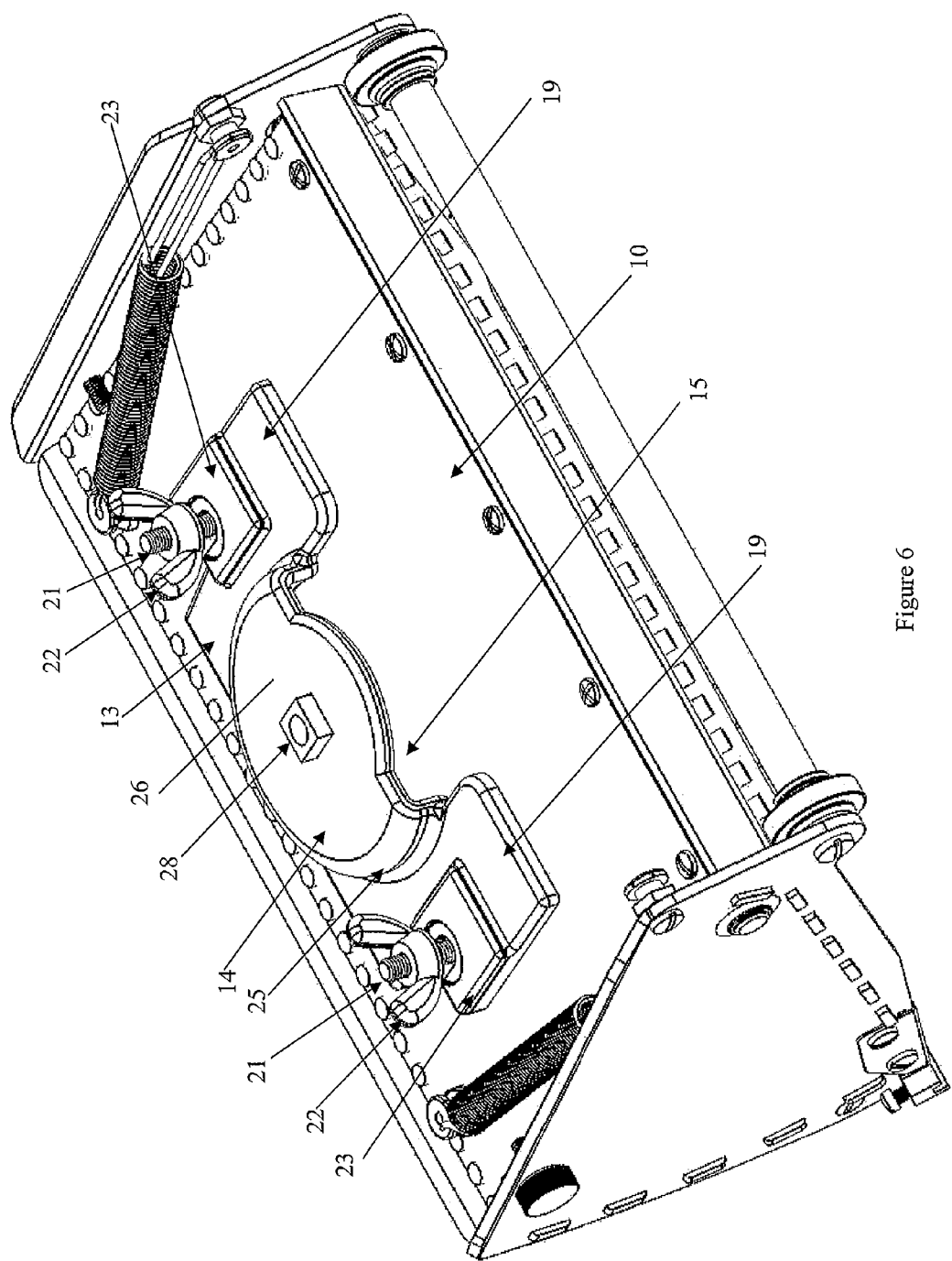
FIG. 6 is a rear isometric view of a first part of an adjustable attachment mechanism between the applicator box and handle with the second part and handle removed.

The adjustable attachment 12 is preferably mounted to an upper surface of the applicator box 10 as illustrated in FIGS. 4 and 5.

The illustrated mounting plate 13 is substantially planar except for the raised central portion 14.

In the illustrated embodiment, the mounting plate 13 has a pair of side plates 19. Each of the side plates 19 is planar and is adapted to abut an upper surface of the applicator box 10. Each of the side plates is connected by a plate 20 extending about the central portion on one side, and which together with the side plates 19 creates a substantially U-shaped plate for abutment with the upper surface of the applicator box 10, the U-shaped plate surrounding a main enclosure 15.

The mounting plate 13 has a pair of upstanding threaded fasteners 21 extending therefrom. Each threaded fastener is associated with a wingnut 22.

The mounting plate 13 includes a pair of upstands 23. The fasteners 21 described above are provided in association with the upstands 23 with one fastener 21 typically provided on each upstand 23. The upstands 23 are located at a level further from the surface of the applicator box 10 than the mounting plate 13.

The applicator box 10 and mounting plate 13 are permanently attached to one another and any one of a variety of methods may be used to accomplish this such as adhesives, bonding, fusing or the like.

Each upstand 23 provides or at least partially defines a recess or enclosure between the upstand 23 and the applicator box 10. A head of the fastener 21 is received therein with a fastener shank extending upwardly away from the applicator box 10. Preferably, a U-shaped opening 24 is provided in the upstand 21 in order to allow the fastener 21 to be associated with the upstand 23 by sliding the shank into the opening 24 such that the head of the fastener 21 is received in the recess or enclosure.

The raised portion 14 of the mounting plate 13 defines a main enclosure 15 located approximately central across the mounting plate 13. The mounting plate 13 is mounted to the applicator box 10 approximately centrally to prevent twisting of the applicator box when desired.

The main enclosure 15 is at least partially defined by an upward extending side wall 25 and a laterally extending cover 26. Typically, the laterally extending cover 26 has an opening 27 therethrough.

As illustrated, the main enclosure 15 is preferably at least partially circular when viewed in plan. According to the most preferred embodiment, the main enclosure 15 will be circular with a circular segment removed, when viewed in plan. The removal of the circular segment preferably forms an access opening into the main enclosure 15.

The main enclosure 15 preferably provides a housing for the thumbwheel 18 of the clamping assembly. The portion of the side wall 25 which has been removed, allows access to the thumbwheel 18 or alternatively, the thumbwheel may protrude at least partially through the open sidewall.

Typically, the thumbwheel 18 is specifically sized to fit within the main enclosure 15 and be rotatable within.

The main enclosure 15 also preferably includes a shaped upstand 28 about the opening 27 through the laterally extending cover 26. This shaped upstand 28 is a collar which will typically act to guide and support the threaded fastener 17 attaching the mounting plate 13 relative to the attachment portion 16.

The invention also includes an attachment portion 16 to attach the handle 11. The attachment portion 16 is a planar plate. The attachment portion 16 also normally includes a pair of opposed attachment flanges 29. Each attachment flange 29 is perpendicular to the planar attachment portion 16. Each attachment flange 29 has a transverse opening 30 in order to receive a pivot rod 31 to which the handle 11 is attached.

There is an intersecting opening 32 in each attachment flange 29 which intersects with the transverse opening 30 in each flange 29. The intersecting opening 32 is adapted to receive a grub screw 33 or similar which can abut the pivot rod 31 connecting the handle 11 and therefore capable of clamping the pivot rod 31 in position or to allow pivoting of the pivot rod 31 when the grub screw 33 is free of the pivot rod 31.

The planar attachment portion 16 is provided with a central opening. The central opening in the plate 16 is aligned with the opening 27 in the mounting plate 13 and normally, a fastener 17 extends through both openings in order to attach the attachment portion 16 to the mounting plate 13.

The central opening 80 in the planar attachment portion 16 is surrounded by a shaped recess to receive the head of the fastener 17 as illustrated in FIG. 7. The shaped recess prevents rotation of the fastener 17 due to abutment of the head with the surrounds defining the shaped opening and also allows the head to be sunk into the planar attachment portion 16 so as to be unobstructive.

Typically, a lower surface of the planar attachment portion 16 is provided with an abutment surface in order to abut one or more braking washers 34.

Figure 2:
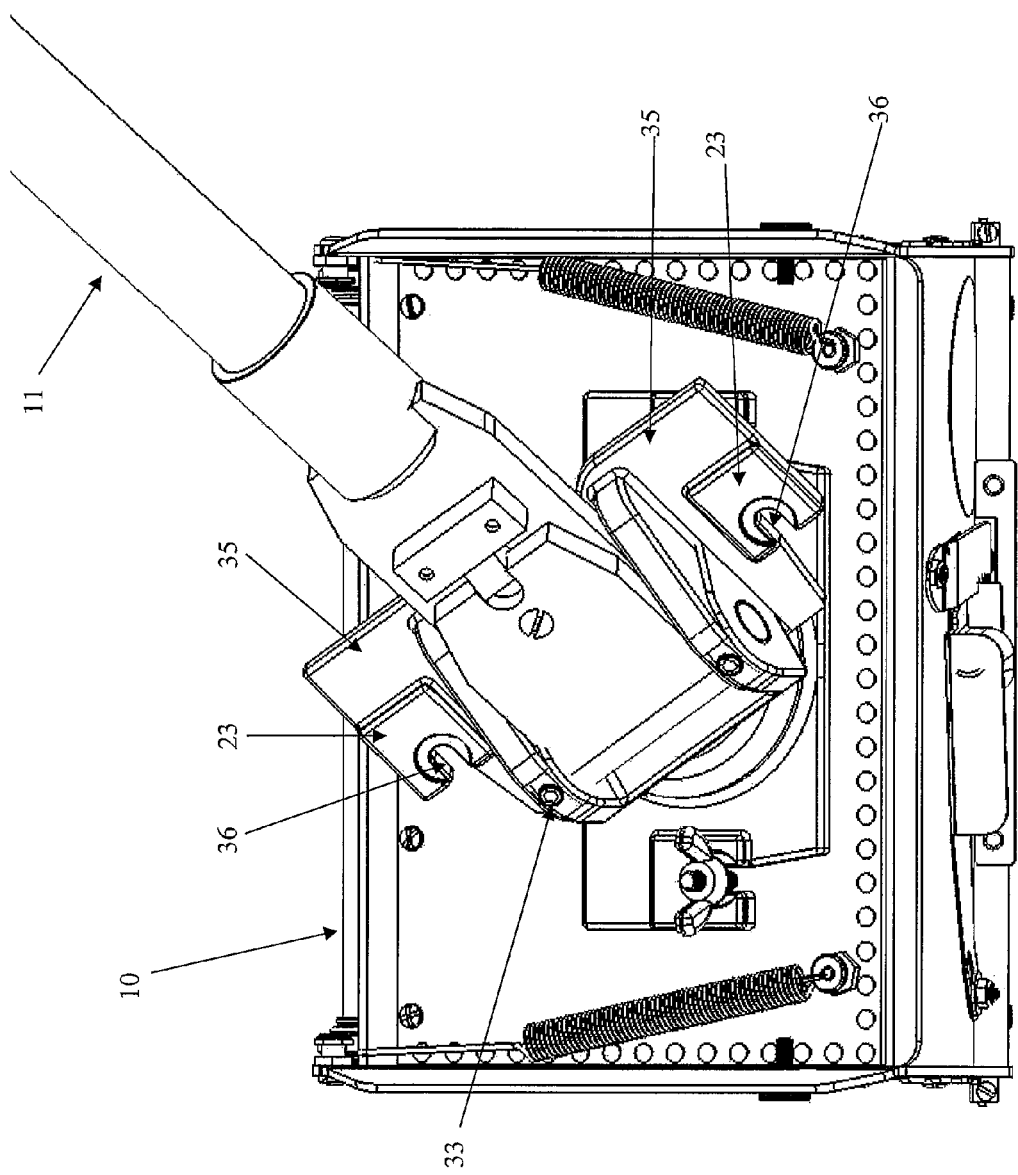
FIG. 2 is a top view of the attachment between the applicator box and handle of FIG. 1.
Figure 3:
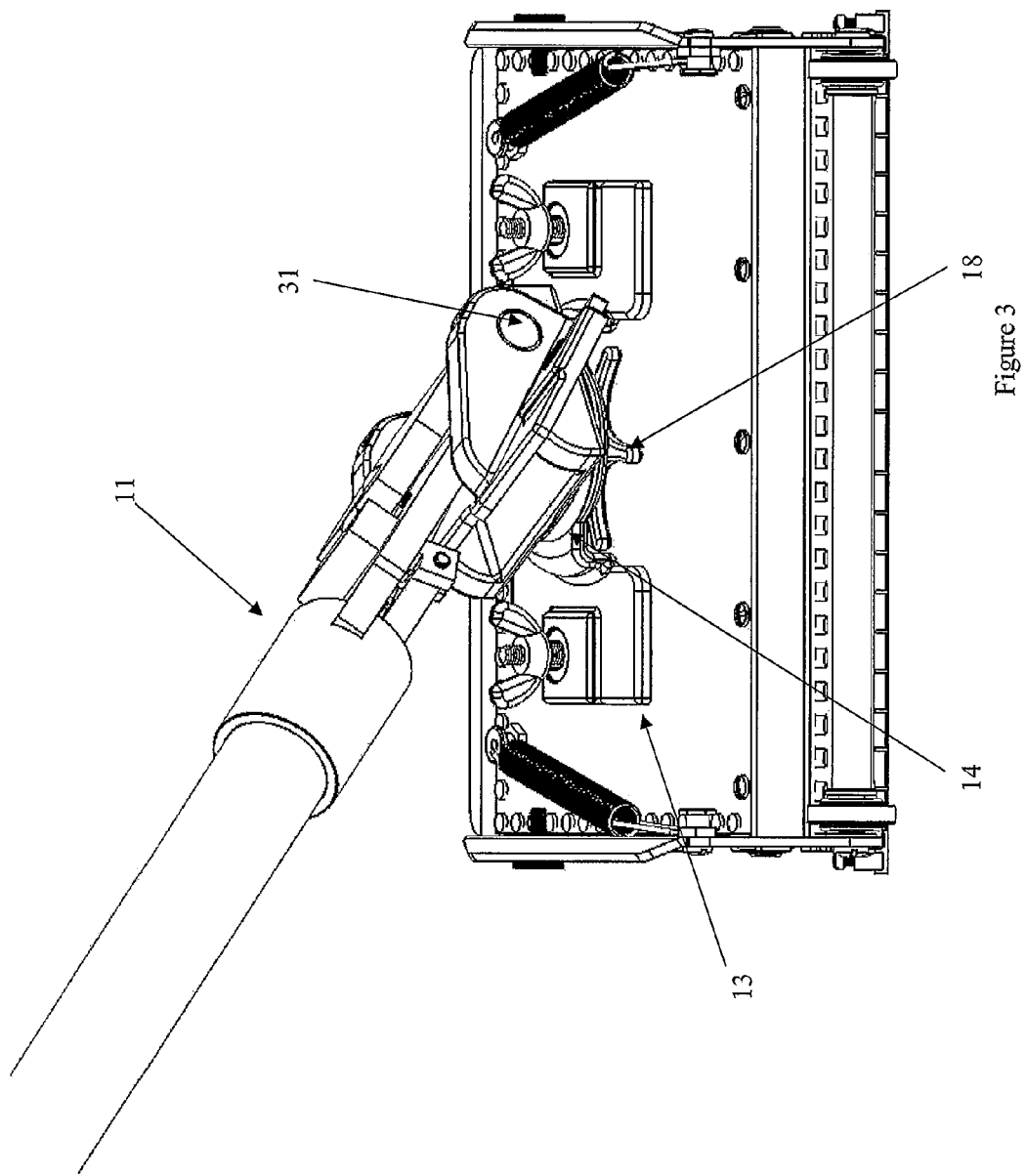
FIG. 3 is a rear view of the attachment between the applicator box and handle of FIG. 1.

According to a preferred embodiment illustrated in FIGS. 2 to 4, a pair of side wings 35 are provided as extensions to the planar attachment portion 16 outside the attachment flanges 29 Each of the wings 35 is provided with a U-shaped opening 36 adapted to receive the upstanding fasteners 21 extending from the mounting plate 13 in order to fix the orientation of the handle 11 and the applicator box 10 in a "square" position. By manipulation of the wingnut 22 provided with the fastener 21, the wingnut 22 may clamp the wings 35 relative to the mounting plate 13 once the U-shaped openings 36 are aligned with the fastener 21. When removed, the attachment portion 16 may be freely manipulated into the desired position and then fixed there with the clamping assembly including the thumbwheel 18.

An annular collar 37 is provided or an underside of the attachment plate 16 in order to receive or guide parts of the clamping assembly.

It can be seen from the above description that the adjustable attachment of the invention therefore provides the ability to fix the handle to the attachment portion at a particular orientation, to fix the attachment portion and the mounting plate at a "square" orientation and to fix the attachment portion and mounting plate at any of the orientation as required. The preferred embodiment also has the ability to fix the handle to the attachment portion in a fixed position as well as to allow the handle to pivot relative to the attachment portion.

The invention also includes a clamping assembly to clamp the attachment portion 16 to the mounting plate 13. The clamping assembly includes the threaded fastener 17 extending through the attachment portion 16 and the mounting plate 13. This fastener 17 is a bolt in the illustrated embodiments. The bolt typically engages with the thumbwheel 18 which is located in the main enclosure 15.

A Bellville washer 38 is located between an underside of the enclosure 15 and the upper side of the thumbwheel 18 oriented such that the edges of the Bellville washer 38 abut the enclosure 15 and a central portion of the Bellville washer 38 abut the thumbwheel 18.

The thumbwheel 18 has a central abutment portion configured as an annular collar or similar with a main opening and an internal thread in order to engage with the fastener 17.

An outer portion is provided on the thumbwheel 18 with a number of finger members or any other gripping means to allow a user to rotate the thumbwheel 18.

Four braking washers 34 are provided surrounding the fastener 17 and the upstanding collar 28 on the upper side of the raised enclosure 15 on the mounting plate 13 and within the annular collar 37 which extends from the lower surface of the attachment portion 16. Each washer 34 is annular and is received about the upstanding collar 28 on the raised enclosure 15 of the mounting plate 13 and within the annular collar 37 on the attachment portion 16 in order to allow the collars to guide rotation.

As the name indicates, the washers 34 have a braking function. They are therefore typically manufactured of materials or coated with materials which have a high coefficient of friction. Additionally, they may be at least partially resilient.

Figure 14:
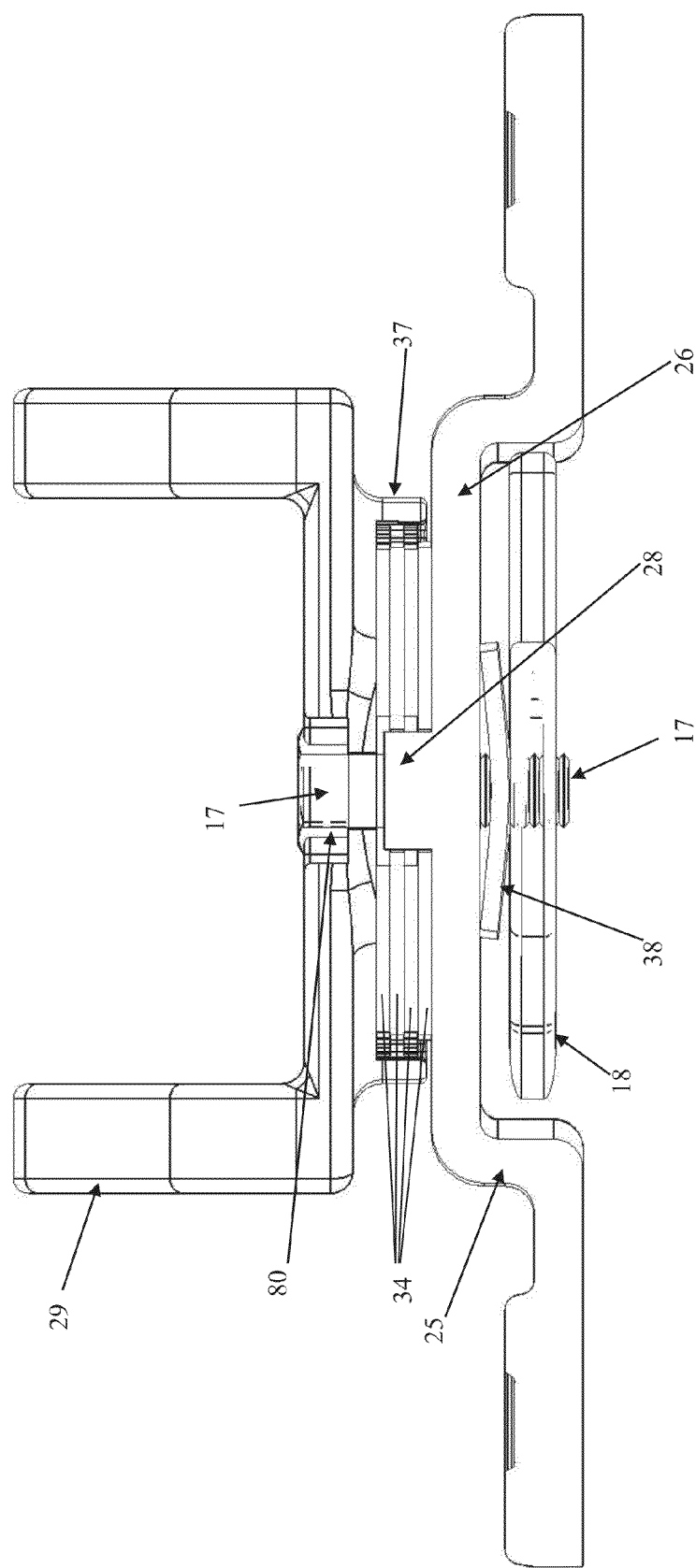
FIG. 14 is a sectional view of an adjustable attachment mechanism according to a preferred embodiment along line A-A in FIG. 8.

As illustrated in FIG. 14, together, the braking washers 34 are taller than the annular collar 37 provided on the lower side of the attachment portion 16 in order to prevent abutment of the collar 37 with the mounting plate 13 even when the clamping assembly is tightened. The braking washers 34 abut one another directly.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An adjustable attachment for an applicator box to attach a handle, the adjustable attachment including a mounting plate for attachment to the applicator box having a raised portion defining an enclosure between the raised portion and the application box, the enclosure accessible from at least one side, and an attachment portion to attach to the handle, and a clamping assembly to clamp the attachment portion to the mounting plate and including at least one threaded member associated with a thumbwheel, rotation of the thumbwheel moving the clamping assembly between a clamped condition which at least temporarily fixes the applicator box and handle relative to one another and a free condition in which the applicator box and handle are movable in relation to one another.

2. An adjustable attachment for an applicator box as claimed in claim 1 wherein the mounting plate has a pair of side plates connected by a plate extending about the enclosure on at least one side, and which together with the side plates creates a substantially U-shaped plate for abutment with the upper surface of the application box.

3. An adjustable attachment for an applicator box as claimed in claim 1 wherein the mounting plate is provided with one or more fasteners extending upwardly away from the applicator box.

4. An adjustable attachment for an applicator box as claimed in claim 3 wherein the mounting plate includes one or more upstands providing or at least partially defining a recess or enclosure between the upstand and the applicator box and including a U-shaped opening is provided in the upstand in order to allow the fastener to be associated with the upstand, and the fasteners are provided in association with the upstands with one fastener provided on each upstand.

5. An adjustable attachment for an applicator box as claimed in claim 1 wherein the enclosure is at least partially circular with an opening therethough and defined by an upward extending side wall and a laterally extending cover.

6. An adjustable attachment for an applicator box as claimed in claim 5 wherein the enclosure includes a shaped upstand about the opening through the laterally extending cover.

7. An adjustable attachment for an applicator box as claimed in claim 1 wherein the attachment portion includes a planar plate extending between a pair of opposed attachment flanges.

8. An adjustable attachment for an applicator box as claimed in claim 7 wherein each attachment flange is perpendicular to the planar plate and has a transverse opening in order to receive a pivot rod to which the handle is attached.

9. An adjustable attachment for an applicator box as claimed in claim 8 wherein an intersecting opening which intersects with the transverse opening is provided in each attachment flange, the intersecting opening adapted to receive a grub screw or similar which can abut the pivot rod connecting the handle and therefore capable of clamping the pivot rod in position or to allow pivoting of the pivot rod when the grub screw is free of the pivot rod.

10. An adjustable attachment for an applicator box as claimed in claim 7 wherein a central opening is provided in the planar plate surrounded by a shaped recess in the plate.

11. An adjustable attachment for an applicator box as claimed in claim 7 further including a pair of side wings provided as extensions to the planar plate outside the attachment flanges, each of the wings is preferably provided with at least one U-shaped opening. Typically, each opening will be a U-shaped opening or have a U-shaped portion.

12. An adjustable attachment for an applicator box as claimed in claim 1 including an annular collar provided on an underside of the attachment plate in order to receive or guide parts of the clamping assembly.

13. An adjustable attachment for an applicator box as claimed in claim 1 wherein the clamping assembly includes a threaded fastener extending through the attachment portion and the mounting plate to engage with the thumbwheel.

14. An adjustable attachment for an applicator box as claimed in claim 1 wherein a Bellville washer is located between an underside of the enclosure and an upper side of the thumbwheel, the Bellville washer oriented such that the edges of the Bellville washer abut the enclosure and a central portion of the Bellville washer abut the thumbwheel.

15. An adjustable attachment for an applicator box as claimed in claim 1 wherein one or more braking washers are provided between the mounting plate and the attachment portion.

16. An applicator box and handle with an adjustable attachment for an applicator box to attach a handle, the adjustable attachment including a mounting plate for attachment to the applicator box having a raised portion defining an enclosure between the raised portion and the application box, the enclosure accessible from at least one side, and an attachment portion to attach to the handle, and a clamping assembly to clamp the attachment portion to the mounting plate and including at least one threaded member associated with a thumbwheel, rotation of the thumbwheel moving the clamping assembly between a clamped condition which at least temporarily fixes the applicator box and handle relative to one another and a free condition in which the applicator box and handle are movable in relation to one another.

\* \* \* \* \*